United States Patent
Yamaguchi et al.

[11] Patent Number: 6,033,501
[45] Date of Patent: Mar. 7, 2000

[54] PROCESS FOR PREPARING CUSHIONING STRUCTURE USING FIBER ASSEMBLY AND APPARATUS THEREFOR

[75] Inventors: Masanao Yamaguchi; Hideki Ohkouchi, both of Ibaraki, Japan

[73] Assignee: Teijin Limited, Osaka, Japan

[21] Appl. No.: 08/973,713

[22] PCT Filed: Jul. 2, 1996

[86] PCT No.: PCT/JP96/01828

§ 371 Date: Dec. 29, 1997

§ 102(e) Date: Dec. 29, 1997

[87] PCT Pub. No.: WO97/02377

PCT Pub. Date: Jan. 23, 1997

[30] Foreign Application Priority Data

Jul. 4, 1995 [JP] Japan .................................. 7-168698
Mar. 27, 1996 [JP] Japan .................................. 8-072637

[51] Int. Cl.[7] ........................... B29C 35/04; B29C 35/16; B68G 11/02
[52] U.S. Cl. ......................... 156/62.2; 156/245; 156/580; 264/121; 264/122; 425/419; 425/420; 425/422
[58] Field of Search ................... 156/62.2, 245, 156/580; 264/121, 122; 425/412, 419, 420, 422, 423

[56] References Cited

U.S. PATENT DOCUMENTS 3,325,349  6/1967  Reifers .
5,079,074  1/1992  Steagall et al. .
5,093,946  3/1992  Difloe .
5,482,665  1/1996  Gill .

FOREIGN PATENT DOCUMENTS 7-324266  12/1995  Japan .
WO 91/18828  12/1991  WIPO .

Primary Examiner—Sam Chuan Yao
Attorney, Agent, or Firm—Foley & Lardner

[57] ABSTRACT

A process for preparing a cushion structure by loosening fiber aggregate comprising crimped staple fibers and binder fibers, having a melting points below that of the matrix fibers and dispersed therein, filling the loosened aggregate into gas-permeable mold cavity accompanied with a pressurized air system, and thermoforming the same by heating followed by cooling, wherein the matrix fibers are non-elastomeric, crimped polyester staple fibers and the binder fibers are conjugated staple fibers, comprising a thermoplastic elastomer having a melting point at least 40° C. below that of the matrix fibers and non-elastomeric polyester, the thermoplastic elastomer occupying at least one half of the surface area of the conjugated fibers. When the mold cavity is defined by surrounded area of (1) an upper mold divided into some mold members respectively and independently movable upward/downward, (2) a bottom mold movable upward/downward, and (3) mold frame, the aggregate within the mold cavity can be partially controlled to have a desired compression density even in the step of filling up with the same, at the same time, the aggregate can be uniformly and satisfactorily packed into even a mold cavity having a complicated shape, thereby providing a process and an apparatus for producing a cushion structure which is more inexpensive and has better performance than cushion structures produced by the conventional process in a short time on actually commercial scale.

28 Claims, 10 Drawing Sheets

6,033,501

PROCESS FOR PREPARING CUSHIONING STRUCTURE USING FIBER ASSEMBLY AND APPARATUS THEREFOR

TECHNICAL FIELD

The present invention relates to a process and an apparatus for preparing a cushion structure used for such as automobile and airplane seats, etc. Especially, a process and an apparatus for preparing a cushion structure from a mixture of synthetic fibers, in which binder fibers having a melting point lower than that of crimped matrix fibers are dispersed and mixed into the matrix fibers; wherein the fiber mixture is transported by entrainment with air flow into a mold cavity, and then turned a fiber aggregate (hereafter expression "a fiber aggregate" used herein is employed to mean "an aggregate of a fiber mixture".) into the cushion structure by a heating and a cooling process in the mold cavity.

BACKGROUND OF THE INVENTION

In the arts of preparing cushion structures, foamed polyurethane material is well used to form automobile or airplane seats and the like.

However, foamed polyurethane seats have problems that the chemicals used in the process of its production are difficult to handle and that freon is discharged. Furthermore, because the compression characteristics of foamed polyurethane seats show a unique feature that it is hard at the initial stage of compression and then abruptly sink down, it not only is scanty in the cushioning property but also gives a strong "bottom-hit feel". Still more, the seats have little air-permeability and consequently is apt to become stuffy, which renders the seats objectionable as cushion structures in many cases. On top of it, foamed polyurethane seats are soft and have little resilient power against compression because it is foamed. The resilient power can be improved by increasing ensity of foamed seats, but such also increases the weight and invites a fatal defect that its air-permeability is still aggravated.

Further, foamed urethane seats generate poisonous gases when it is burned out in the furnace and it is difficult to use for recyclable material, then it is longed new material made of the fibers aggregate for the cushion structure instead of foamed polyurethane seats.

For producing said cushion structures in order to replace said foamed polyurethane seats, it has been widely practiced to turn the fiber aggregates, which include dispersed and mixed binder fibers in matrix fibers, into cushion structures by the heating and the cooling process. This is to say, the cushion structures are produced by uniting the fibers with the molten binder fibers dispersed and mixed into the matrix fibers, and then the molten binder fibers act as bonding agent to adhere the fibers at their points of intersection. And by adequate selection of polymers which form both matrix fibers and binder fibers, the cushion structures made of the fiber aggregates are expected to be able to replace foamed polyurethane seats having many defects said above.

In spite of these advantages of cushion structures made of the fiber aggregate, they have disadvantage such as increasing costs, because they require much man-power and excessive time to produce them. Therefore, there are many proposals on method/apparatus to make cushion structures from the fiber aggregates in order to reduce costs and man-power.

For instance, International Patent Application WO91/18828 discloses an apparatus for producing a cushion structures in a gas-permeable mold through which suction acts on its all sides in a vacuumed filling chamber as follows; inducing air flow by said suction; transporting loosened padding fiber aggregate with accompanied air flow into the mold; filling up an inside of the gas-permeable mold with said fiber aggregate; and thereafter turning said fiber aggregate into the cushion structure throughout a heating and a cooling process.

However, such apparatus must adopts a suction means to transport the fiber aggregate into a gas-permeable mold accompanied with air flow, which is induced by a suction which acts on the mold, because of this reason said apparatus has serious disadvantages as follows.

First, when mold cavity has more complicated shape (especially, when it has the shape getting deeper), it is very difficult to fill up the each portion of the mold cavity with the fiber aggregate having desired bulk density. Since, when the mold cavity has longer length relative to its back part to some extend, the fiber aggregate is apt to be accumulated not only on deepest side of the mold cavity but also on each sides of the mold cavity on which the suction acts, and a passage through which the fiber aggregate go toward the deepest side of the mold cavity by entrainment with air flow is getting narrower and narrower, and thus the amount of the supplied fiber aggregate to the deepest side of the mold cavity is getting less and less. Moreover, in the worst case, the passage through to the deepest side of the mold cavity is completely closed by accumulated fiber aggregate on the both sides of the passage. In such a case, it is obvious that production of the excellent cushion structure, having desired bulk density and the amount thereof, is very difficult, because the fiber aggregate filled up into the mold cavity is less uniform and even has voids, so that cushion structures manufactured by said method/apparatus is fatal defect.

Secondly, said mold has no means for compressing the filled fiber aggregate actively to adjust compression rate to get the moderate bulk density after the filling step is over, because the mold is positioned in a stationary state in the filling chamber. Mainly from this reason, in such a case that different densities are required corresponding to its each portion in the cushion structure, it is no use applying said apparatus for adjusting the partial density of cushion structure.

Thirdly, it is impossible for said apparatus to stuff the mold cavity with the fiber aggregate in a state of high bulk density by a suction, because a stuffing force induced by the suction is not so stronger than that of compression air.

In U.S. Pat. No. 5,482,665 a method/apparatus is disclosed which does not depend on such suction induced by vacuum. In said patent the method/apparatus uses for introducing the fiber aggregate into a mold cavity by traversing an injector from one side to the other side of the mold cavity, so that the fiber aggregate is dispensed onto the female mold. It is sure that, by using said method/apparatus said above, the fiber aggregate can be dispensed onto the mold cavity of the female mold evenly, but they have fatal problems as follows.

First of all, in such method/apparatus, it is quite difficult to shorten the filling cycle time of the fiber aggregate into the female mold, because said method/apparatus require a injector, which traverses from the one end of the mold cavity to the other end, for filling up a mold cavity with the fiber aggregate in order not to be dispensed unevenly thereon.

Secondly, when the female mold cavity is widened, said method/apparatus require a series of injector to cover its all filling area corresponding to its widened mold cavity, and moreover, in this case, said method/apparatus require more complicated device to drive these injectors synchronized with each other in order to traverse the injectors in the same direction. And also, they require ceaseless downward air flow from the top of the female mold in order to realize evenly dispensed and accumulated state in the fiber aggregate onto the bottom cavity of the female mold.

Thirdly, the problem takes place when the mold cavity is filled up with the fiber aggregate in the height direction of the female mold, because it causes a problem that a pile of accumulated fiber aggregate is apt to collapse by the downward wind from the top of the mold. And this problem becomes more serious, as the amount of the supplied air are increased in order to accumulate the fiber aggregate more evenly onto the bottom of the mold cavity, so that the air flow becomes a turbulent flow which is difficult to rectify. Therefore, the height of the piled fiber aggregate onto the female mold is limited, so, in order to fill up as uniform as possible with the fiber aggregate in the height direction, it requires to adjust the height of the piled fiber aggregate and to average it by traversing the injectors from the one end of the mold cavity to the other end for many times. Because of this reason, it is obvious that said method requires so much time for filling up the mold cavity with the fiber aggregate, that it is no use for said method expecting time-shortened molding and cost reduction for making the cushion structure.

Fourthly, as being easily imaginable, because of requiring for the fiber aggregate to pile up in the height direction, said method has such a serious problem that it can not get the height of the piled fiber aggregate to be high or low partially. Therefore, said method for inserting the male mold into the female mold may be impossible to control a cushion structure having a desired shape to make within only one cycle time. Then, in order to partially control the bulk density of the cushion structure in its each selected portion, from a viewpoint of reduction of molding time and cost said method has a fatal problem because it requires another filling process for filling up a depression formed at a selected portion, having the higher bulk density than that of the other, with the fiber aggregate.

Despite the cushion structure made of the fiber aggregate has many advantages, in a viewpoint of cost reduction and mass production, it can not yet replace the same made of foamed polyurethane, because it take much time to turn the fiber aggregate into the cushion structure. On the other hand, said formerly, a cushion structure from foamed polyurethane has many problems, and also it is inferior to that from a fiber aggregate in its performance and character. Therefore, up to now, in spite of having a lot of excellent performance the cushion structures from the fiber aggregate have not been largely produced on a commercial scale for the use of the seat material of automobile, airplane, etc.

DISCLOSURE OF THE INVENTION

The first object in the present invention is to provide a process and an apparatus for preparing cushion structures from the fiber aggregate, being truly produced on a large commercial scale instead of preparing the same from polyurethane having various kinds of defects. Therefore, for attaining this purpose, cost reduction and mass production must be required to provide the method and apparatus for turning the fiber aggregate into the cushion structure in a short time in order to economically produce it on a large scale.

Moreover, generally cushion structures provided for the use of automobile seats or airplane are destined to be repeatedly seated by many men, so that it is largely and repeatedly deformed and loaded by concentrated stress at the points of intersection where the fiber aggregate is firmly bonded with each other. In such a case, if the bonding points were rigidly fixed without elasticity, said points of intersection were easily broken by repeatedly loaded concentration stress induced by large deformation.

From these reason said above, the second object of the present invention is to provide process/apparatus for preparing cushion structures formed from thermoplastic elastomers, which reduce the concentration stress at the crossing points where the fibers of the fiber aggregate have thermally bonded with each other, so that it comes to have strong durability under the repetitive large deformation.

Third object of the present invention is to provide process/apparatus for preparing the cushion structure having partially changed bulk density, within a short time without wasting so much time.

And, fourth object of the present invention is to provide process/apparatus for quickly taking out a cushion structure from a mold after turning a fiber aggregate into a cushion structure.

In order to achieve the purpose said above, in the present invention, we recite a process for preparing a cushion structure, and also recite an apparatus for preparing a cushion structure.

First of all, a method for making a cushion structure in the present invention is provided as follows:

A process for preparing cushion structure using fiber aggregate, wherein binder fibers having a melting point which is higher than that of matrix fibers are mixed and dispersed with the matrix fibers which are made from synthetic staple, and that said fiber aggregate is thermally molded into the cushion structure having a desired shape by bonding the fused binder fibers with the matrix fibers at their crossing points, which is characterized in that comprising the following steps of (a)–(e):

(a) conforming a mold cavity having a larger shape than that of the molded cushion structure, whereas the mold cavity is surrounded by a top part of a gas-permeable upper mold which is movable upward/downward, a bottom part of a gas-permeable bottom mold which is movable upward/downward, and a fixed side part of a mold frame;

(b) packing said fiber aggregate into the mold cavity from an open mouth of the mold frame, after loosening a desired amount of the fiber aggregate, by pressurized air with which the fiber aggregate is accompanied;

(c) compressing the fiber aggregate packed in the mold cavity to desired bulk density;

(d) binding by the fused binder fibers with the matrix fibers at their crossing points by passing through heating air, and after heating and/or during cooling process, further compressing the fiber aggregate to the position where the cushion structure is finally molded to the desired shape, while the fiber aggregate is cooled down by cooling air which flows through the fiber aggregate; and (e) taking out the cushion structure from the mold cavity by moving the bottom mold downward.

According to the present invention, it is used non-elastomeric, crimped polyester staple fibers as the matrix fibers.

And, it is also used elastomeric conjugated fibers composed of a thermoplastic elastomer having a melting point of lower than that of the polyester polymer constituting the staple fibers, by at least 40° C., and a non-elastomeric polyester, the former being exposed at least at a half of the fiber surface.

Herein, said fiber aggregate loosened by a loosening device is introduced by accompanied air flow, which is induced by pressurize air blown from on the way of a transfer duct and/or which is induced by a rotating cylinder of the loosening device, wherein it is important not to directly install in a blower having impellers on the way of the transfer duct, so that the loosened fiber aggregate can not retrieve the unloosened state by the impact of the impellers.

Thus, the filling process of the fiber aggregate accompanied with the compression air flow into the mold cavity is carried out. On the other hand, during the filling process, the fiber aggregate accompanied with the compression air flow is filled up with from the deepest portion of the mold cavity, and then the bulk volume of the fiber aggregate is partially reduced by downward movement of the upper mold, which is divided into some mold members both individually and sequentially movable upward/downward, corresponding to the partially filled up portions of the mold cavity.

As the divided members of the upper mold said above is independently moved downward, the each portion of the fiber aggregate is compressed to the each desired density corresponding to the each traveled stroke of the divided members, and thus the each portion of the molded cushion structure is controlled to desired density respectively.

And, after the filling process into the mold cavity is completed, a sucking process is carried out through the fiber aggregate via the upper mold and/or the bottom mold, so that accumulation direction of layer-shaped faces of the fiber aggregate in the mold cavity can be partially rearranged.

Furthermore, before the heating process is carried out, it is very effective to repeatedly compress the fiber aggregate filled up in the mold cavity in order to randomize the accumulation direction of said layer-shaped faces by the reciprocating motion upward/downward of the upper mold.

In addition, with regard to this filling procedure of the fiber aggregate into the mold cavity, which has plural different filling length relative to its back part therein, it is apt to cause the generation of voids and/or less uniform density distribution of the fiber aggregate in the mold cavity. Therefore, in the case that the mold cavity has said complicated shape, it is important to adjust the mouth width of the transfer duct in accordance with changing front-edge width of the back part in said mold cavity while the fiber aggregate is filled up.

However, it is required for the mold cavity to be filled up with the fiber aggregate accompanied with an air flow, which flows in the direction intersecting with the right angle relative to the direction where the upper and the bottom mold move upward/downward.

And furthermore, in such filling process said above, it is required not to cause the turbulent flow in the mold cavity, and to be filled up every corner of the mold cavity with the fiber aggregate without unevenly filled up portions. Therefore, it is necessary to smoothly exhaust the compression air, which accompanies the fiber aggregate, from the mold cavity by an exhaust device set up in outside of the mold cavity.

Then, it is required to partially adjust each gas-permeability of mold walls corresponding to flow resistances in the each portion of the fiber aggregate against the penetrating air flow, so that the heating air and/or the cooling air can pass through the fiber aggregate therein evenly.

Said gas-permeability of the mold walls can be embodied by adjusting distribution densities and/or sizes of holes wrought in mold walls.

After a series of the process said above were completed, a thermal process starts in which the fiber aggregate turns into the cushion structure by binding the matrix fibers with the binder fibers as a bonding agent at their crossing points, and this thermal process is carried out by the method as follows.

With regard to this process, during a heating and/or a cooling processor after the heating process, it is desirable that the fiber aggregate is compressed to a position finally shaped as the cushion structure, so that heat contraction of the fiber aggregate in the heating and/or cooling process may be absorbed by at least one compressing motion of the upper mold and/or the bottom mold.

And also, in order to shorten the molding time in the heating process, a quantity and/or a temperature of the heated air passing through the fiber aggregate are adjusted to over multiple grades in a thermal process in which the fiber aggregate turns into the cushion structure.

Moreover, the cooling air is passed through the heated fiber aggregate from downward to upward, so that said fiber aggregate can stick to the upper mold by the wind pressure of the cooling air, and the cooling air is suspended after downward motion of the bottom mold, therefore finally the cushion structure is took out to fall it down from the mold cavity by an action of the gravity.

With regard to this, the cushion structure may not fall down only by its own weight because of adhering to the upper mold. in such a case, the present invention provides a process for spraying compression air over the cushion structure from a top of the upper mold after the cooling air flow has suspended.

In addition to a temperature of the cooling air is preferable to be as low as possible, such a temperature as by at most 40° C., in order to effectively cool down the cushion structure.

Next, an apparatus for preparing a cushion structure to state in the following is provided in order to carry out the method said above for making a cushion structure.

Namely, the present invention provides an apparatus, which comprises at least the following elements (a)–(h), for preparing a cushion structure by heat molding from synthetic staple fiber aggregate having matrix fibers in which binder fibers is dispersed and mixed.

(a) a loosening devise for getting the fiber aggregate in a loosened state, (b) a fixed mold frame which has an open bottom and a open top, and consists the side mold wall by itself, (c) a gas-permeable bottom mold, movable to the open bottom of said mold frame, for closing said open bottom;

(d) a gas-permeable upper mold divided into some mold members, independently movable upward/downward to the open top, for closing said open top, (e) a transfer duct for transporting the loosened fiber aggregate into a mold cavity surrounded by the mold frame, the bottom mold, and the upper mold respectively, (f) an air supply device for supplying compression air to the transfer duct from an air supply pipe opened to the transfer duct, (g) a heating air generator for generating heating air which flows through the gas-permeable upper mold, the fiber aggregate filled up in the mold cavity, and the bottom mold respectively, and (h) a cooling air supply device for supplying cooling air, which flows through the gas-permeable bottom mold, the fiber aggregate filled up in the mold cavity, and the upper mold respectively, to cool down the filled fiber aggregate in the mold cavity which is heated by the heating air supplied from said heating air generator.

Here, in the present invention, it is important for said apparatus to equip with the upper and the bottom mold having holes, of which distribution densities and sizes are desirably adjusted in accordance with each compression degree of the fibber aggregate compressed by each mold member of the upper mold.

In addition to said apparatus, it is desirable that the apparatus comprises an adjustment device for adjusting the mouth width of the transfer duct in accordance with changing front-edge width of a back part in the mold cavity while the fiber aggregate is filled up.

Also, in the cooling air supply device of the present invention, it act as a device for supplying the cooling air flow which flows from downward to upward while penetrating into the fiber aggregate.

it is important for said apparatus to further comprises an auxiliary air exhaust device, which is installed in a gas-permeable side wall of the mold frame as a forming part of the mold cavity, for exhaust the compression air supplied by the air supply device from the mold cavity.

Here, said auxiliary air exhaust device is installed in the outside of the mold frame confronting to the opened mouth of the transfer duct connected with the mold frame.

Further, the apparatus of the present invention equips with actuators run by fluid pressure, as means for actuating the upper mold divided into some mold members and the bottom mold both movable upward/downward relative to the mold frame, wherein said actuators have positioning devices for controlling each moving position of the divided mold members of the upper mold and/or the position of the bottom mold in order to compress the fiber aggregate for multiple stages.

Next, in the apparatus of the present invention, in order to make the accumulation faces of the fiber aggregate parallel along the mold surface, it further comprises an air suction device for sucking inside air of the mold cavity from the bottom through the filled fiber aggregate.

Moreover, in order to help the cushion structure adhered to the upper mold to fall downward, the apparatus of the present invention further comprises some air spray nozzles for spraying compression air over the cushion structure from the top of the upper mold.

And finally, downward, in order to take out the cushion structure from the mold cavity, the apparatus of the present invention further comprises a tray, movable to below the mold cavity, for receiving the falling cushion structure after moving the bottom mold downward.

BRIEF DESCRIPTION OF THE DRAWINGS

FIGS. 5(a) and 5(b) are a front view and a plane one respectively, FIG. 5(c) is a plane view which shows an example of a desirable method for filling up the mold cavity with the fiber aggregate without said adjustment device and FIG. 5(d) is a plane view for explaining the problem caused by a method which is not applied to the present invention, FIG. 6, with regard to explanation of gas-permeability through the gas-permeable mold, illustrates plural walls, picked up from each mold, which form the mold cavity (in other words, the part of the mold which surrounds the fiber aggregate), herein.

OPTIMUM EMBODIMENT FOR PRACTICING THE INVENTION

Figure 1:
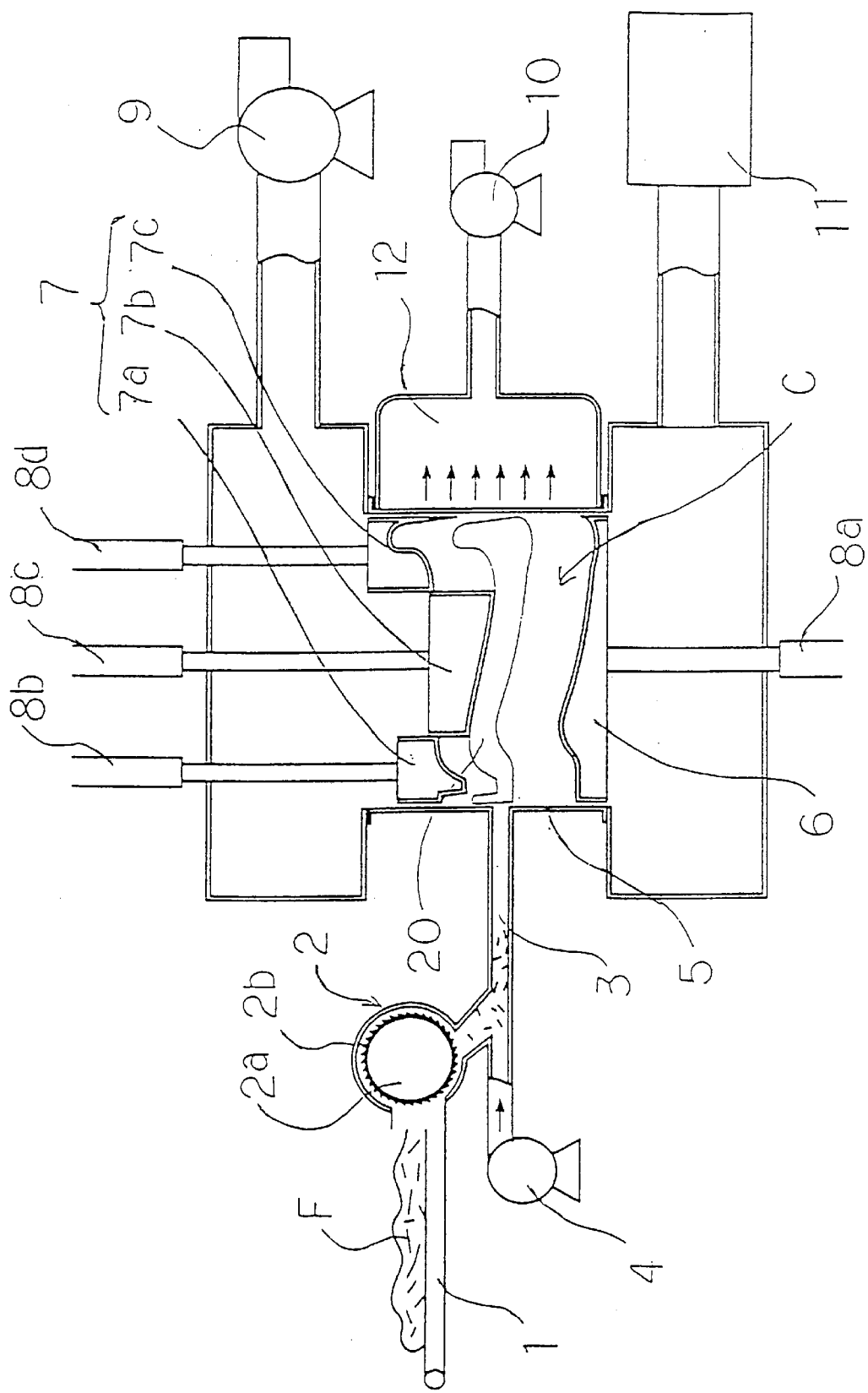
FIG. 1 is schematically illustrated front views of an apparatus of the present invention for making a cushion structure from fiber aggregate, FIGS. 2(a) and (b) are schematically illustrated front views of procedures for filling up a mold cavity with the fiber aggregate accompanied with a compression air flow, and these figures diachronically show the state that the fiber aggregate is sequentially filled up from a back part of the mold cavity through the state of the shown FIG. 2(a) to that of the shown FIG. 2(b), FIGS. 3 (a) and (b) schematically show the enlarged front views which illustrate the state that the layer-shaped accumulation faces of the fiber aggregate filled up in the mold cavity are run parallel along the mold surface, where

The optimum embodiment for practicing the invention is hereafter explained more specifically in further details.

In the present invention, the fiber-crossing portions bonded by the molten binder fibers are formed of resilient thermoplastic elastomer, and these portions are eased from concentrated stress, thereby, as it has already been stated, it is desirable to make a cushion structure which has huge durability under repetitive large deformation.

In order to achieve this purpose, in the present invention, the matrix fibers constituting one member of the fiber aggregate are preferably made of the non-elastomeric, crimped, polyester, staple fibers. And, the binder fibers constituting the other member are preferably made of the elastomeric, conjugated, staple fibers, which are composed of a thermoplastic elastomer having a melting point of lower than that of the polymer of the polyester staple fibers, by at least 40 degrees, and a non-elastomeric polyester. Wherein, the said conjugated fibers are occupied by said thermoplastic elastomer at least at a half of the fiber surface. Thus, by using said fiber aggregate the non-elastomeric polyester staple fibers where thermoplastic elastomer contact at the crossing points are bonded with the molten thermoplastic elastomer.

And it is also important in the present invention to use the conjugated staple fibers, which partially contain thermoplastic elastomer instead of fully contained one. Because it is sufficient for the binder fibers, in its containing rate of thermoplastic elastomer, to contain the necessary quantity which act as the fiber-fiber bonding agent in fusing state. However, in the binder fibers fully made of heat bonding compound, it is necessary for the binder fibers to increase the opportunity to intersect with the matrix fibers, by intervening the binder fibers into the matrix fibers, in order to bond sufficiently with each other. In this case, more than binder fibers which is required must be mixed and dispersed into the matrix fibers, then if a large quantity of the thermoplastic elastomer is used as the heat bonding agent, it is so expensive that a cushion structure made by said material loose the cost competition power with that of the conventional urethane foams.

Whereas, according to the present invention, the binder fibers made of the conjugated staple fibers, as non-elastomeric polyester fibers being exposed at least a half of the thermoplastic elastomer, is used instead of fully thermoplastic elastomeric fiber so that the use quantity of thermoplastic elastomer may be reduced consequently. Moreover, in comparison with the case that fully thermoplastic elastomeric binder fibers are used, the binder fibers of the present invention make it possible to reduce the use quantity of the expensive thermoplastic elastomer, and also make it possible to mix and disperse it into the matrix fibers consequently.

Furthermore, according to the present invention, it is easy to increase the quantity of the binder fibers mixed and dispersed into the matrix fibers at a low cost than conventional one composed of the fully thermoplastic elastomer, and it is possible to increase the fiber-crossing points between the matrix fibers and binder fibers, consequently also to increase the fiber-fiber bonding portions, so that the performance of a cushion structure may be improved.

Thus, in spite of partially composing expensive thermoplastic elastomer, by the present invention it comes to realize to make the cheaper replaceable cushion structure from conjugated fibers than that from the conventional urethane foam.

Herein, according to the present invention, the synthetic staple fibers constituting the matrix fibers of the fiber aggregate, which are not specifically limited, include ordinary staple fibers formed of polyethylene terephthalate, polybutylene terephthalate, polyhexamethylene terephthalate, polytetramethylene terephthalate, poly-1,4-dimethylcyclohexane terephthalate, polypivalolactone, and their copolyesters; blends of such fibers; and conjugated fibers formed of at least two of above-mentioned polymer components. The filament could have any cross-sectional shapes such as circular, flattened, modified or hollow. The size of the filament preferably ranges from 2 to 500 deniers, particularly from 6 to 300 deniers. When the deniers of the filament is too small, density of the cushion structure increases to often impair elasticity of the structure as a whole, whereas when the deniers is too large, handlability of the fibers, particularly moldability of the fiber aggregate, is impaired. Further, the number of fibers forming the matrix becomes objectionably small, to reduce the number of the crossing points formed by them and the elastic conjugated fibers, which results in poor elasticity development in the cushion structure and concurrently in reduction of durability.

In said case, it is desirable that the matrix fibers have given the crimped shape, and is future desirable to have given the concretely crimped shape, in such case, said crimped shape is embodied by the mechanical method such as a crimper etc., the anisotropic cooling method during the spinning process, or the heating method of either side-by-side type or eccentric sheath-core type conjugated fibers.

On the other hand, the elastomeric conjugated fibers as the binder fibers which play an important part in the present invention are likely used, and said elastomeric conjugated fibers are the conjugated staple fibers composed of a non-elastomeric polyester and a thermoplastic elastomer, which have a melting point lower than that of polyester constituting the matrix fibers by at least 40° C. Wherein, it is desirable that the conjugated staple fibers are exposed by the said thermoplastic elastomer at least at a half of the fiber surface. In terms of weight ratio, it is convenient for said binder fibers to have such a conjugation ratio of a thermoplastic elastomer to a non-elastomeric polyester as that of 30/70 through 70/30. The structure of the elastomeric conjugated fibers may be either side-by-side or sheath-core form, but the latter is more preferred. In the case of sheath-core structure, naturally the non-elastomeric polyester serve as the core which may be concentrically or eccentrically located. Eccentric type is the more preferred, because it develops coil-formed elastic crimp.

As the thermoplastic elastomers, polyurethane elastomers and polyester elastomers are preferred.

Polyurethane elastomers are those obtained through reaction of a low-melting polyol having a molecular weight in the order of 500 to 6,000, e.g., dihydroxypolyether, dihydroxypolyester, dihydroxypolycarbonate, dihydroxypolyesteramide or the like; with an organic diisocyanate having a molecular weight not higher than 500, e.g., p,p'-diphenylmethane diisocyanate, tolylene diisocyanate, isophorone diisocyanate, hydrogenated diphenylmethane diisocyanate, xylylene diisocyanate, 2,6-diisocyanate methylcaproate, hexamethylene diisocyanate, etc.; and with a chain-extending agent having a molecular weight not higher than 500, e.g., glycol, aminoalcohol or triol. Of such polymers, particularly preferred are the polyurethanes, for the preparation of which polytetramethylene glycol, poly-ε-caprolactone or polybuthylene adipate is used as the polyol component. In this case, preferred organic diisocyanate component is p,p'-diphenylmethane diisocyanate, and the preferred chain-extending agent is p,p'-bishtdroxyethoxybenzene or 1,4-butanediol.

Those useful as the polyester elastomers are the polyether/ester block copolymers formed through copolymerization of thermoplastic polyesters as the hard segments and poly(alkylene oxide) glycols as the soft segments. More specifically, the copolymers are dicarboxylic acid selected from the group constituting of aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, sodium-3-sulfoisophthalate, etc., alicyclic dicarboxylic acids such as 1,4-cyclohexane dicarboxylic acid, aliphatic dicarboxylic acids such as succinic acid, oxalic acid, adipic acid, sebacic acid, dodecanediacid, dimeric acid, etc.; and their ester-forming derivatives; at least one diol component selected from the group consisting of aliphatic diols such as 1,4-buthanediol, ethylene glycol, trimethylene glycol, tetramethylene glycol, pentamethylene glycol, hexamethylene glycol, neopentyl glycol, decamethylene glycol, etc., alicyclic diols such as 1,1-cyclohexanedimethanol, 1,4-cyclohexanedimethanol, tricyclodecanedimethanol, etc., and their ester-forming derivatives; and at least one poly(alkylene oxide) glycol having an average molecular weight of about 400–5,000, selected from the group constituting of polyethlene glycol, poly(1,2- and 1,3-propyleneoxide) glycol, poly(tetramethylene oxide) glycol, or ethylene oxide/propylene oxide copolymers, and ethylene oxide/tetrahydrofuran copolymers.

From a view to consideration of the adhesiveness to non-elastomeric, crimped, polyester, staple fibers, temperature characteristics and strength, however, block copolymerized polyetherpolyesters are preferred, in which polybutylene terephthalate serves as the hard segment and polyoxybutylene glycol, as the soft segment. In this case, the polyester portion constituting the hard segment is composed of polybutylene terephthalate whose main acid component is terephthalic acid and main diol component is butylene glycol component. Naturally, a part (normally not more than 30 mole %) of the acid component may be substituted with other dicarboxylic acid component or oxycarboxylic acid component. Similarly, a part (normally not more than 30 mole %) of the glycol component may be substituted with dioxy component other than the butylene glycol component.

The polyether portion constituting the soft segment can be composed of the polyethers substituted with a dioxy component other than butylene glycol. The polymers may further contain various stabilizers, ultraviolet absorber, branching agent for increasing viscosity, delusterant, coloring agent and other various improvers as necessitated in individual occasions.

Here, the fiber aggregation said above contains 10–70% of the binder fibers based on the weight of the fiber aggregate, preferably 20–60%, are mixed and dispersed into the matrix fibers, wherein said step is carried out to evenly mix with a heap of the matrix fibers and that of the binder fibers with each other by supplying them through a carding machine.

Hereafter, a process and an apparatus for preparing a cushion structure from a fiber aggregate are explained in detail with drawings.

FIG. 1 is a front view which schematically shows an apparatus for preparing a cushion structure from a fiber aggregate. In said figure, F denotes a fiber aggregate, and the others denote as follows: 1; a conveyor for carrying the fiber aggregate, 2; a loosening device for loosening the fiber aggregate, 3; a transfer duct for transporting the fiber aggregate, 4; a compression air supply device, 5; a mold frame, 6; a bottom mold, 7; a upper mold, 7a–7c; mold members divided the upper mold into, 8a–8d; actuators driven by the fluid pressure for moving the upper mold upward/downward, 9 and 10; an air exhaust device, 11; a heating air generator, and 12; exhaust chamber respectively. And, C denotes a mold cavity. In addition, symbol 20, shown by thin line, denotes the final shape of the molded cushion structure made of the fiber aggregate. But, such a cushion structure can be got after a thermal process, as mentioned later, is completed.

In the apparatus, as mentioned above, a carding machine is conveniently used as the loosening device 2 for loosening the fiber aggregate F, which has many needles 2b installed in an outer circumferential side of a rotating cylinder. A means for supplying the fiber aggregate F to such loosening device 2, as not specifically limited, is preferred to use such a device like a belt conveyor having a moving plane on which the fiber aggregate F is conveyed. Thus, the fiber aggregate F supplied to the loosening device 2 by the conveyor 1 is combed by many needles 2b planted onto the rotating cylinder 2a and loosened thereby. Thereafter, the loosened fiber aggregate F is supplied into the mold cavity C through the transfer duct 3 which is connected with an exit of the loosening device 2 and an entrance of the mold frame 5, so that the fiber aggregate F is packed into the mold cavity C, where the aggregate is transferred by entrainment with compression air blown from on the way of the transfer duct 3, and/or with the induced air by the rotating cylinder 2a of the loosening device 2.

Here, in the present invention, it is very important that such a device like a blower, which generates air flow in the duct 3, must not be directly installed in on the way of the duct 3. When such a device is installed in on the way of the duct 3, a loosened state of the fiber aggregate is damaged by the impact struck by the rotors such as blower's impellers which generate the air flow in the duct. As the result, the fiber aggregate filled up in the mold cavity C comes to have the loosening portions and the mal-loosening portions therein. When such a situation arises, the quality of the finally molded cushion structure is impaired.

Furthermore, it is also important in the present invention that the upper mold 7, the bottom mold 6, and a part of mold frame 5 are having the gas-permeability. Because it is required that the blown compression air for accompanying the fiber aggregate F into the mold cavity C must be quickly exhausted from the mold cavity C. When said compression air blown into the mold cavity may not be smoothly exhausted from the mold cavity C, it causes the turbulent air flow which makes it impossible to fill the fiber aggregate in selected portions of the mold cavity and pile it up therein under good condition. Further, as mentioned later, the gas-permeability of the mold is important element in order to smoothly passing heating and cooling air through the fiber aggregate.

Figure 2:
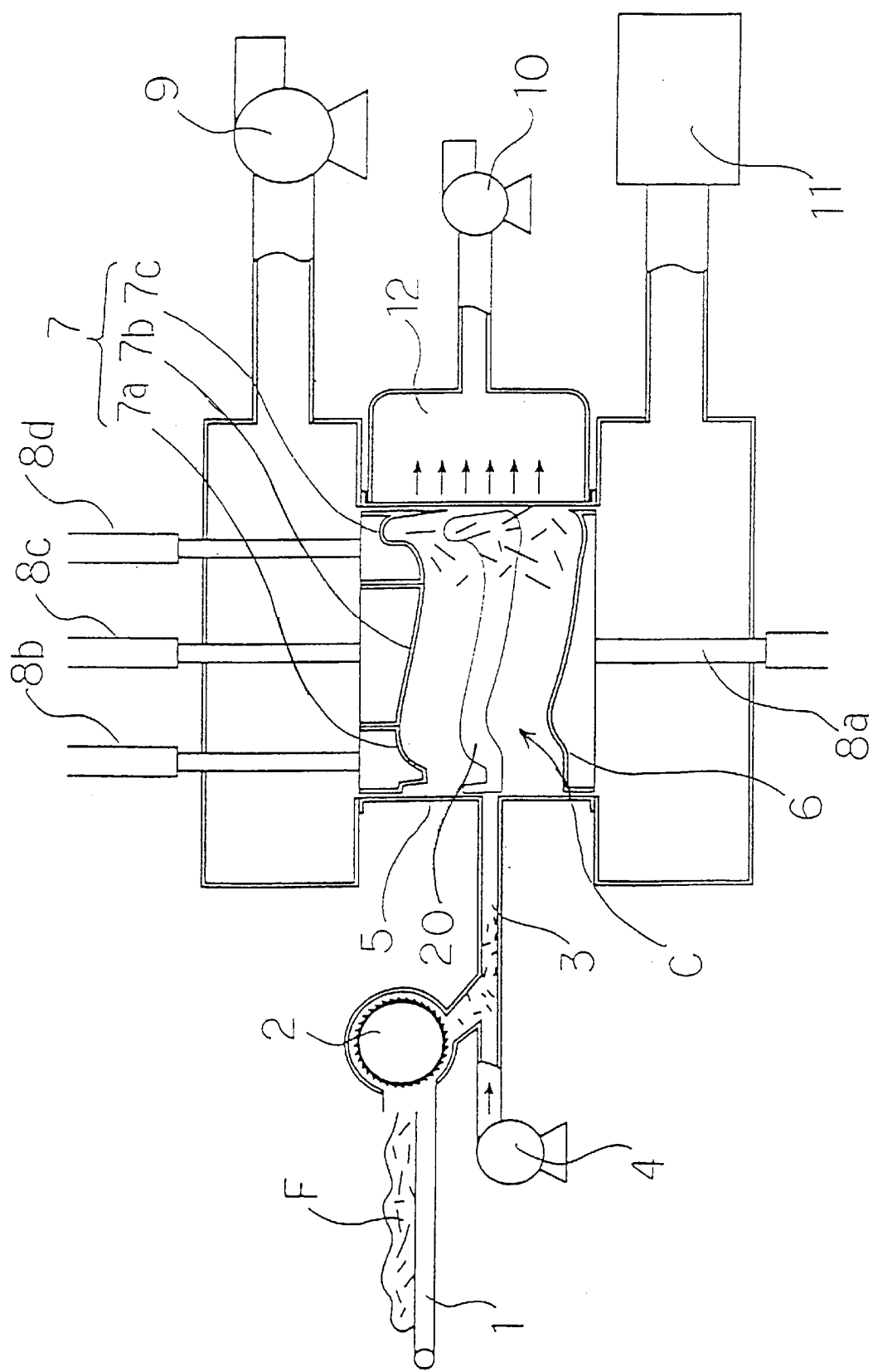
Figure 2:
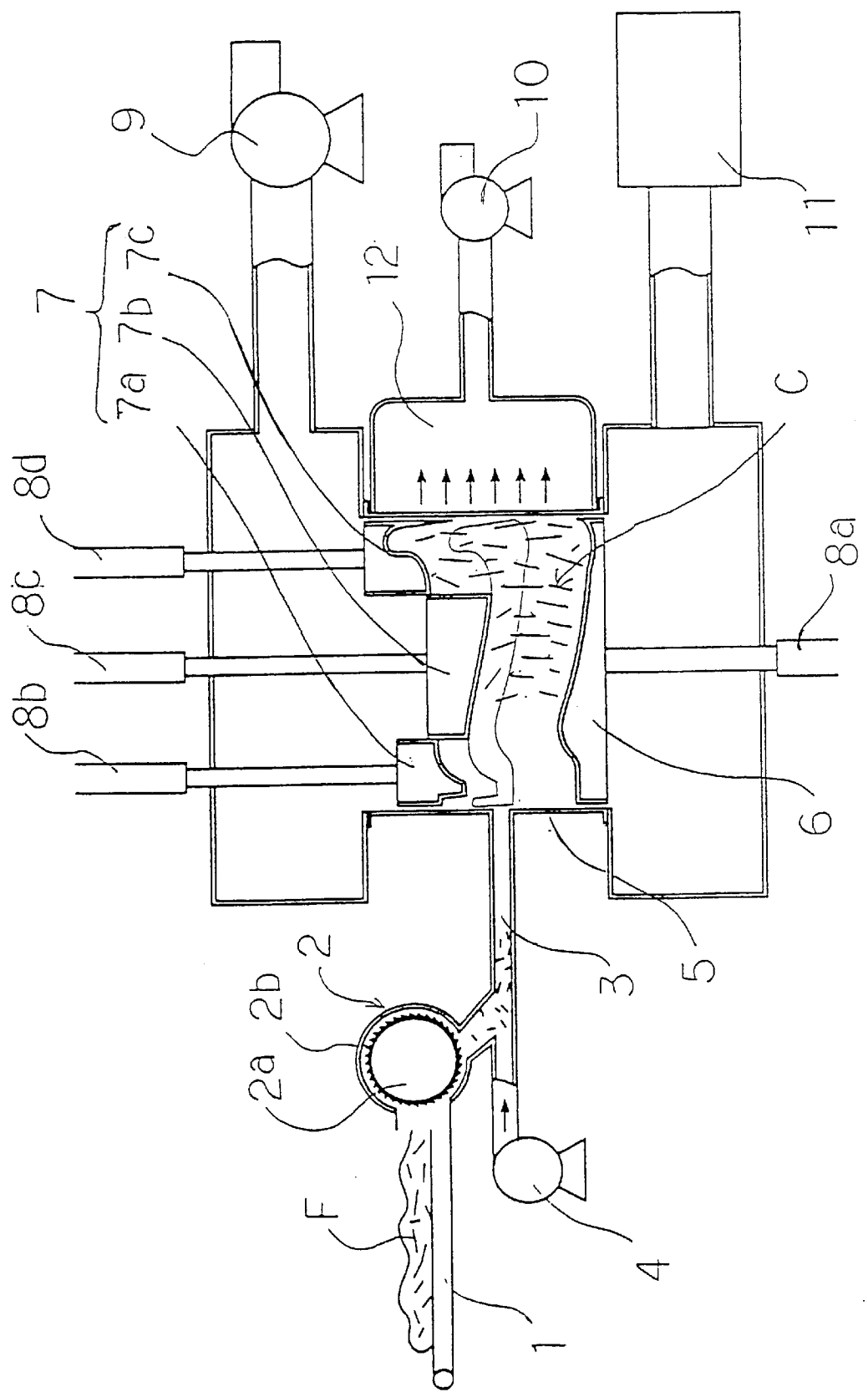

Next, the fiber aggregate is transported through the transfer duct by entrainment with the compression air, and is packed into the mold cavity, hereafter, the more detail of this aspect is explained referring to FIG. 2.

In the present invention, FIGS. 2(*a*) and 2(*b*) are both front views which schematically show steps for filling up the mold cavity with the fiber aggregate by entrainment with compression air flow, and also show the aspects that the fiber aggregate is filled up from the farthest back part of the mold cavity C, as shown in FIG. 2(*a*) through FIG. 2 (*b*) in time series.

Figure 3:
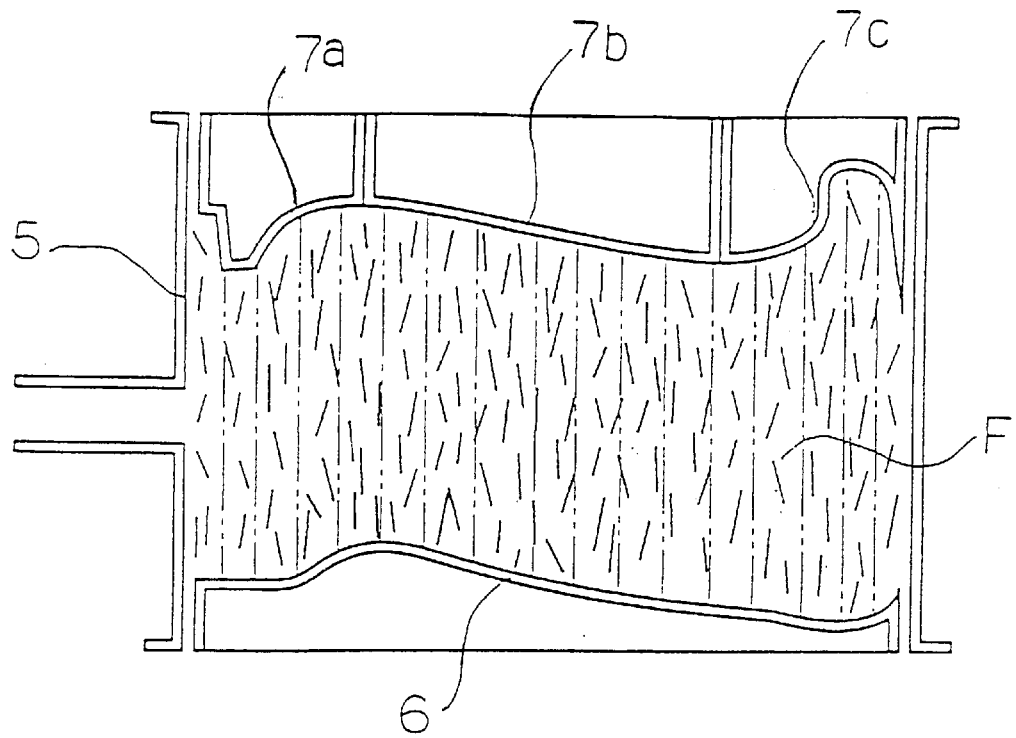
FIG. 3(a) shows a accumulated state of the fiber aggregate before suction.
FIG. 3(b) shows that of during suction.
Figure 3:
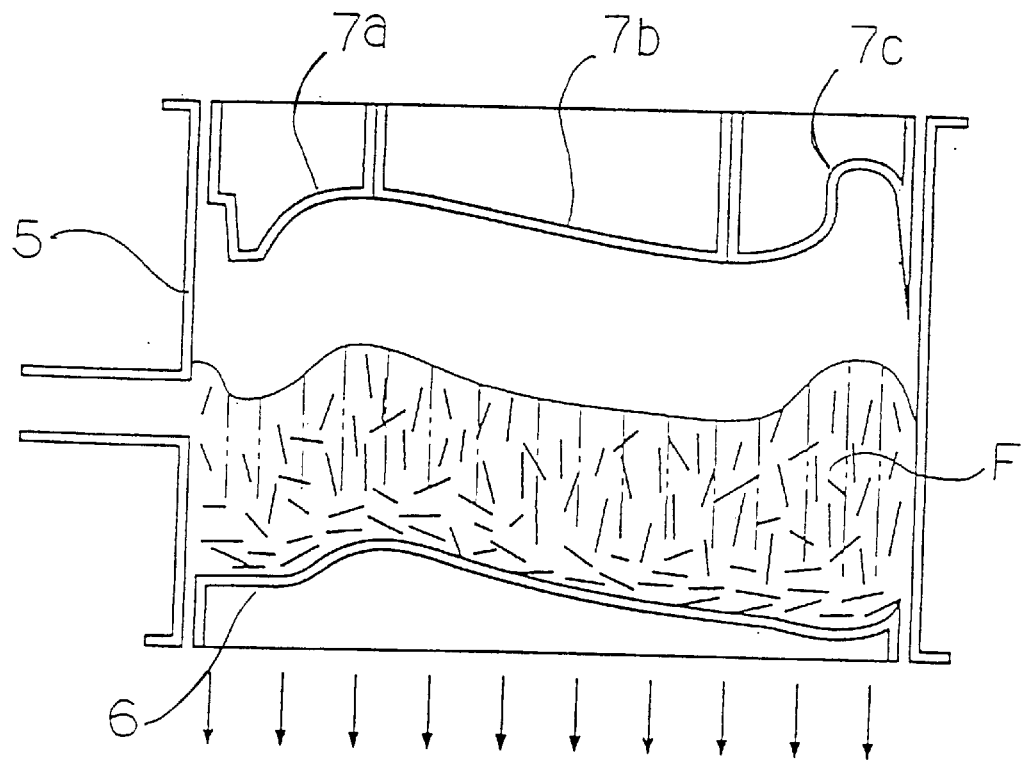

This state is shown in FIG. 3, in which the fiber aggregate is filling up into the mold cavity to go on accumulating, as forming layer-shaped accumulation faces therein, and an aspect is also shown that the fiber aggregate goes on accumulating from the farthest back part of the mold cavity C to the mouth from which the fiber aggregate is blown (see in FIG. 3(*a*)). When the fiber aggregate F being in such a condition is turned into a cushion structure under the condition as it is without any other condition, in-plane tearing strength along accumulating layer faces becomes weaker, on the other hand the same along the right-angled faces relative to the accumulating layer faces becomes stronger. When it has anisotropic tearing strength, it impairs performance as a cushion structure. Therefore, it is desirable for the cushion structure not to have anisotropic tearing strength because it causes remarkably to impair the performance in its tearing strength. And, the appearance of the cushion structure is damaged by striped surface where the sides of the accumulation layers appear, and the condition of its surface finishing becomes rough, so that it is not preferred.

From these reason said above, after the filling step into the mold cavity C is completed, the filled fiber aggregate F is sucked via the bottom mold 6, as shown in FIG. 3(*b*), so that orientation of sucked surface portion of the fiber aggregate preferably goes along the surface shape of the mold. In addition, the space (which is exaggeratedly shown in FIG. 3(*b*) as it is), where the fiber aggregate is not packed, comes to be formed in the upper part of the mold cavity C because the fiber aggregate is downwardly compressed onto the bottom mold 6 by the air induced by the suction from the bottom. After forming the fiber aggregate having such a sucked surface portion, by turning it into a cushion structure, the cushion structure, in which destruction by tearing force may not widely spread even reaching to its surface, can be realized. Further, in order to break down the layer-shaped accumulation faces formed during the filling process, it is effective to repeatedly compress the fiber aggregate F by repeatedly traversing the upper mold 7 downward/upward. In addition, in this case, it is more desirable that each divided member (7*a*–7*c*) of the upper mold 7 may be independently moved upward/downward at random than all divided members can be synchronously moved all together.

In addition, the fiber aggregate F is compressed to the chosen compression ratio by the molds (6 and 7) installed in the top and the bottom part of the apparatus during or after filling step.

Hereafter, it is explained about a compressing operation of the fiber aggregate F filled up in the mold cavity which is formed by the bottom mold 6 and the upper mold 7.

In the present invention, the side part of the mold cavity C filled with the fiber aggregate is formed by the mold frame 5 which has the fully open top, the fully open bottom, and side wall fixed not to move freely. And, the bottom part of the mold cavity C is formed by the bottom mold 6 movable upward/downward and making it possible to close the fully open bottom. Also, the top part of the mold cavity C is formed by the upper mold 7 divided into some mold members both independently and respectively movable upward/downward and making it possible to close the fully open top. Therefore, in the state that the fiber aggregate is about to be filled into the mold cavity C, as shown in FIG. 2(*a*), the bottom mold 6 and/or the upper mold 7 are preliminarily positioned to the position where the mold cavity can have the bigger capacity than that of the cushion structure molded to the desired shape. Thereafter, under such a condition said above, the loosened fiber aggregate accompanied with air flow is packed the mold cavity C with through the transfer duct 3. Thus, the fiber aggregate filled up in the mold cavity C is compressed to the position by the bottom mold 6 and/or the upper mold where it has the desired bulk density.

Wherein, as means for moving the bottom mold 6 and the upper mold divided into some mold members (7*a*–7*c*) upward/downward, actuators (8*a*–8*d*) driven by fluid pressure such as publicly known air cylinders driven by compression air are preferred. In addition, in said actuators (8*a*–8*d*), it is needless to say that, in order to compress the fiber aggregate to over multiple stages, they are installed in the positioning device (not shown in figure) for positioning the bottom mold 6 and/or the upper mold divided into plural mold members to the selected positions. Further, in the present invention, it is also needless to say that as the upper mold 7, only the mold members (7*a*~7*c*) divided in the depth direction of the mold cavity C is illustrated but it is possible to divide it in the width direction of the mold cavity C.

However, by merely to move the bottom mold 6 and/or the upper mold, it is impossible to change partially the compression ratio of the fiber aggregate F and thereby also to change partially the density of the cushion structure. On the contrary, one of the features in the present invention is to be changeable the density of the fiber aggregate without wasting so much time when it would be partially changed.

In order to embody such things said above, in the present invention, it is quite important that the upper mold 7 is to be divided into the plural mold members (7*a*–7*c*) movable in the up-and-down direction respectively and independently and thereby to close the opened top of the mold frame 5. Then, when each portion of the fiber aggregate is selectively compressed in the different ratio, it is easily realized to adjust strokes of the mold members in accordance with the each compression ratio of the each portion of the fiber aggregate by the existence of the mold members movable upward/downward respectively and independently. Namely, the divided mold members (7*a*–7*c*) of the upper mold 7 are preliminarily moved to the each position corresponding to the each compression ratio in the fiber aggregate respectively before filling process begins and thereafter, in such a condition, the fiber aggregate is filled up in the mold cavity C, thus as a result, it is quite easily realized to partially change the bulk density of the fiber aggregate.

Beside, while the fiber aggregate F is compressed by the motion of the molds (6 and 7) it is possible to compress the fiber aggregate after filled up the mold cavity C, but, in the present invention, while the filling process into the mold cavity is carried out, the each divided mold member of the upper mold 7 is descended one after another from the back part of the mold cavity C where filling procedure is partly completed (shown in FIGS. 2(*b*) and 2(*c*)). By doing like this, a passage for transferring the fiber aggregate through the back part of the mold cavity can be widely secured, and makes it possible to fill up smoothly the back part of the mold cavity where evenly filling up is very difficult.

And then, filling step into the mold cavity in the present invention makes it possible for the first time by pressing a fiber aggregate to the back part of the mold cavity due to the action of the pressing force of compression air. Therefore, in prior arts which such force do not act, it was very difficult to partially compress the fiber aggregate because the function, for maintaining the filling condition of the fiber aggregate as it is, may not work at all.

However, according to the method and/or the apparatus of the present invention, different from the prior arts, it does not need the injectors for transferring the fiber aggregate into the back part of the mold cavity and for distributing it onto it evenly, does not need to disperse the transferred fiber aggregate by the action of the air flow, and further does not need to act the vacuum on every sides of the mold. Namely, the present invention only requires accompanied compression air flow in order to pack the mold cavity C with the fiber aggregate from its back part.

In such a thing said above, it is quite important for the present invention that filling process is carried out so that the fiber-aggregate accompanied with the compression air flow is filled up the mold cavity C not from a moving direction of the mold (6 and 7), but from a direction where it intersects with the right angle in the moving direction of the mold (6 and 7). Thus, there are no filling means like injector to impede the movement of the bottom mold 6 and/or the top one 7 in the mold cavity C during the filling process, so make it possible to move them in the up-down direction freely at the desired timing.

Further, another feature of the present invention is that the adjustment device for adjusting the mouth width of the transfer duct 3 is installed in the inside of the duct 3 positioned nearby the mold frame 5 for the mold cavity C having plural different lengths relative to its back part. With regard to this, it explains in detail referring to the FIG. 4 and 5 in the following as followed.

Figure 4:
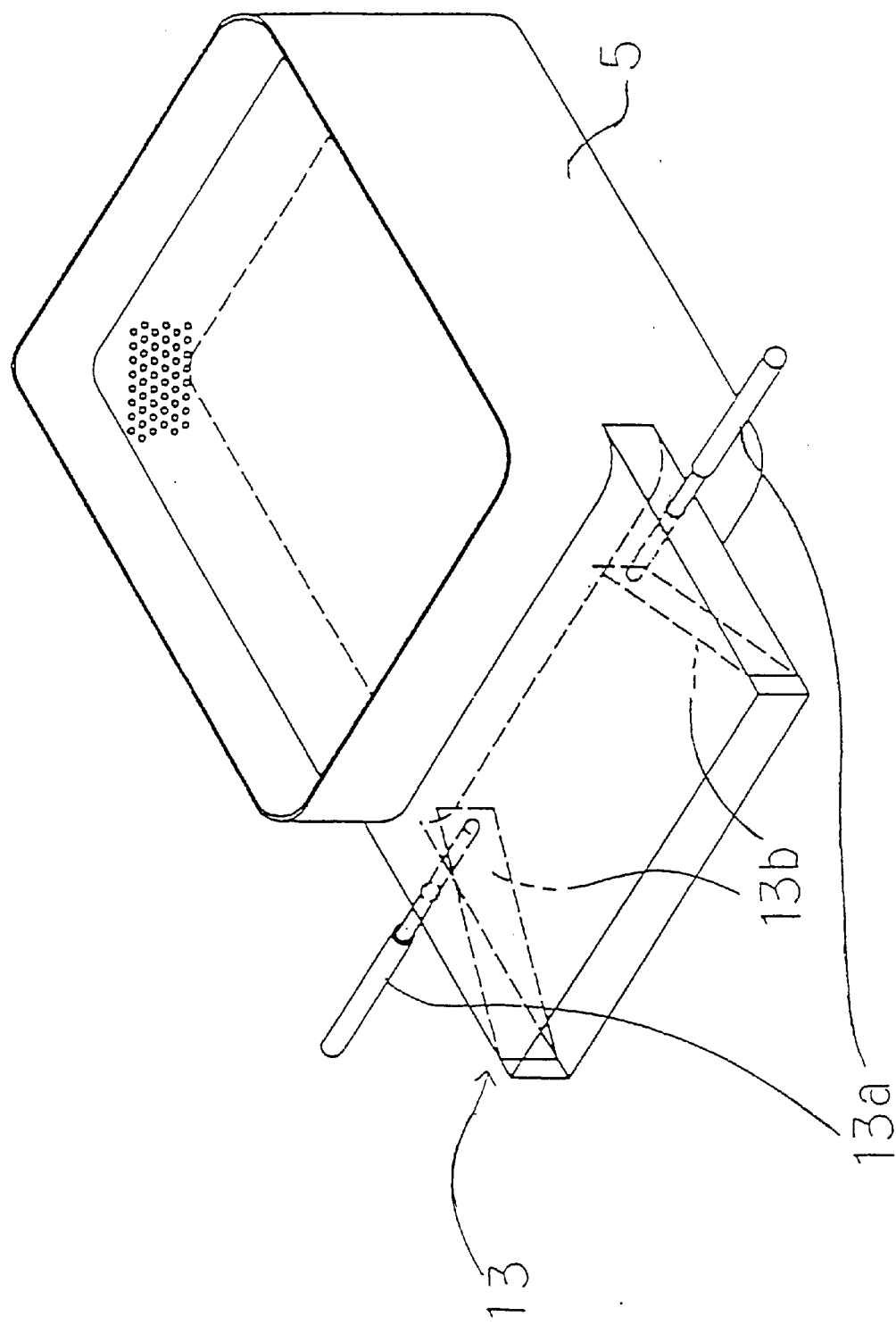
FIG. 4 is a perspective view of an apparatus which schematically shows an adjustment device for adjusting mouth width of the transfer duct in accordance with changing front-edge width of the back part in said mold cavity, which has plural different lengths relative to a back part.
Figure 5:
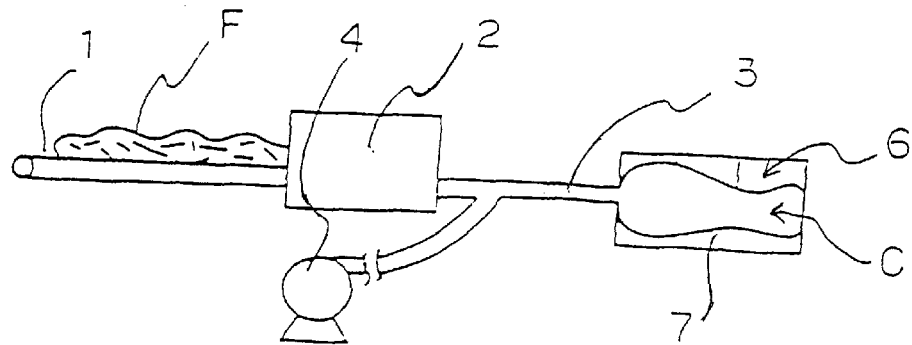
FIG. 5 is an explanation figure which illustrates the action and effect of the adjustment device (shown in FIG. 4) while the fiber aggregate is filled up in the mold cavity, which has different filling lengths relative to a back part herein, then
Figure 5:
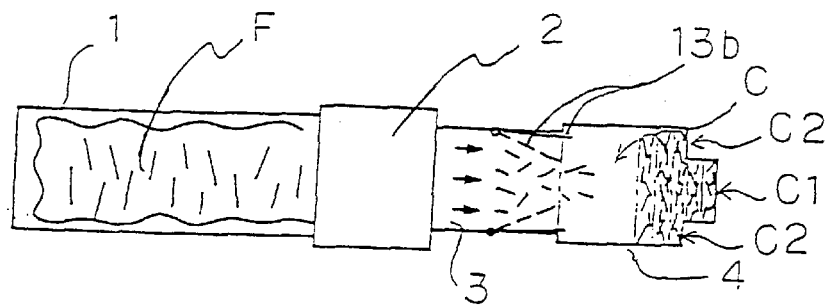
Figure 5:
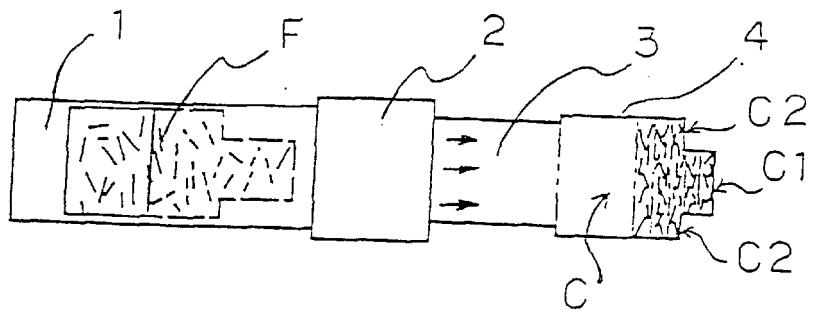
Figure 5:
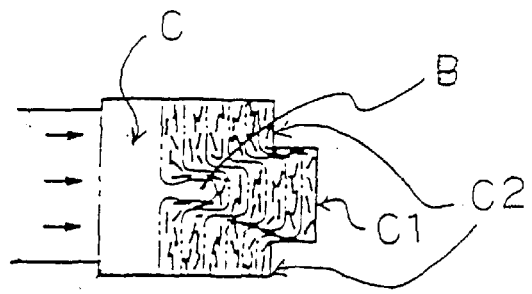

FIG. 4 is the enlarged perspective view which schematically shows the adjustment device 13 for adjusting mouth width of the transfer duct 3, and it allows to change its mouth width of the duct 3 so that width-adjustable plates 13b swingable right and left are moved in the right or the left directions by a driving means 13a containing a power cylinder driven by fluid pressure. And then, as illustrated in FIGS. 5(a) and (b), by installing in such device 13, the present invention makes it possible to fill up the mold cavity C with the fiber aggregate F selectively from the farthest back part (C1) of the mold cavity C without an outbreak of voids, so that the mouth width of the duct 3 for transporting the fiber aggregate F is changeable in accordance with its changing front-edge width of the back part. If the fiber aggregate was evenly filled up the mold cavity having both a farthest length (C1) and a short length (C2) relative to the back part of the mold cavity, a passage of the mold cavity where the fiber aggregate would pass through toward the farthest back part would be gradually narrowed by the accumulation of the fiber aggregate supplied to the short length (shown in FIG. 5(d)). And, it may cause the outbreak of voids and unevenly filled bulk density because of insufficiently supplied fiber aggregate. Therefore, the above method is very effective in such a case that the mold cavity has different lengths relative to its back part. In addition, in order to evenly fill up the mold cavity with the fiber aggregate F, it is preferred to preliminarily trimming it in accordance with the back part shape of the mold cavity, placing it onto a conveyor belt, and thereafter supplying it to a loosening device 2, as shown in FIG. 5 (c).

Here, on the occasion of filling up the mold cavity C with the fiber aggregate F, the ventilation of the compression air introduced into the mold cavity C is smoothly carried out by installing in an auxiliary air exhaust device 10 confronting to an entrance of the gas-permeable mold frame 5 where a transfer duct 3 is connected. Then, it is preferred to fill up evenly at every corner of the mold cavity with the fiber aggregate without dirty spots. It is effective to use such an auxiliary means 10 together as the shape of the mold cavity C becomes complicated one. Because, unless the compression air which has introduced into the mold cavity in accompanied with the fiber aggregate F is smoothly exhausted from the mold cavity C, such a compression air flow becomes turbulent flow, and therefore the position of the mold cavity where the fiber aggregate is accumulated and filled up cannot be controlled precisely any more. On the contrary, the present invention makes it possible to filled up at every corner of the mold cavity C with the fiber aggregate F without dirty spots so that the discharge of the compression air from the mold cavity C can be intentionally controlled by the auxiliary air exhaust devices attached to the each portion of the mold cavity C.

Next, when filling up the mold cavity C with the fiber-aggregate F said above is completed, the fiber aggregate is compressed by desired bulk density, and thereafter a thermal process for turning a fiber aggregate into a cushion structure is started.

This thermal process, as being natural, contains both a heating process and a cooling one, because, in such a thermal process, the binder fibers contained in the fiber aggregate are melted, and the fibers are bonded by the molten binder fibers as acting on the bonding agent, and finally it is turned into a cushion structure. However, in this thermal process, it is necessary to take account of the peculiar character of the fiber aggregation. Namely, the fiber aggregate has extremely good property in its gas-permeability, then it is more effective to directly heat up and/or cool down the fiber aggregate filled up in the mold cavity by the heating and/or the cooling air penetrating through fibers than indirectly heat up and/or cool down it by heating up and/or cooling down the molds themselves. And, it also has an effect that it can be heating up and/or cooled down the fiber aggregate uniformly by adopting this method.

By the way, the remarkable fact in the present invention is that the each bulk density in the each portion of the fiber aggregate filled up in the mold cavity are partially changed to compress respectively by the each divided member of the upper mold corresponding to its each compression ratio. Therefore, in the present invention, the gas-permeability of the gas-permeable molds becomes very important element in order that a heating air flow or a cooling one may penetrate smoothly through the fiber aggregate which bulk density is partly different from. Because, when the bulk density of the fiber aggregate is partly different, both easily gas-flowable part in the fiber aggregate and not easily gas-flowable one appear. When such a situation arises, heating dirty spots or cooling dirty spots appear in the fiber aggregate and it make it impossible to get a cushion structure of the uniform quality.

Figure 6:
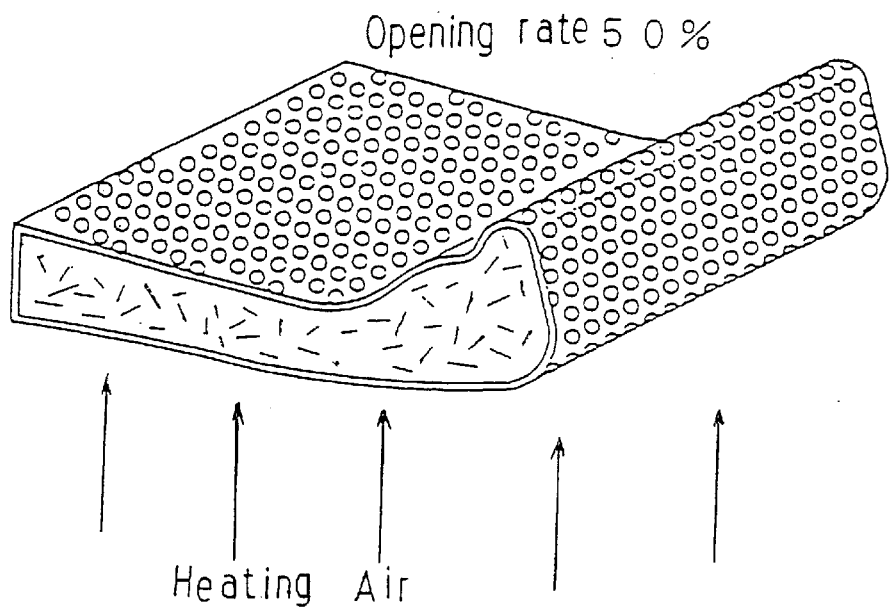
FIGS. 6(a) and 6(b) are a partially broken perspective view respectively shown the each case that the gas-permeability through the mold is not partially changed and is partially changed.
Figure 6:
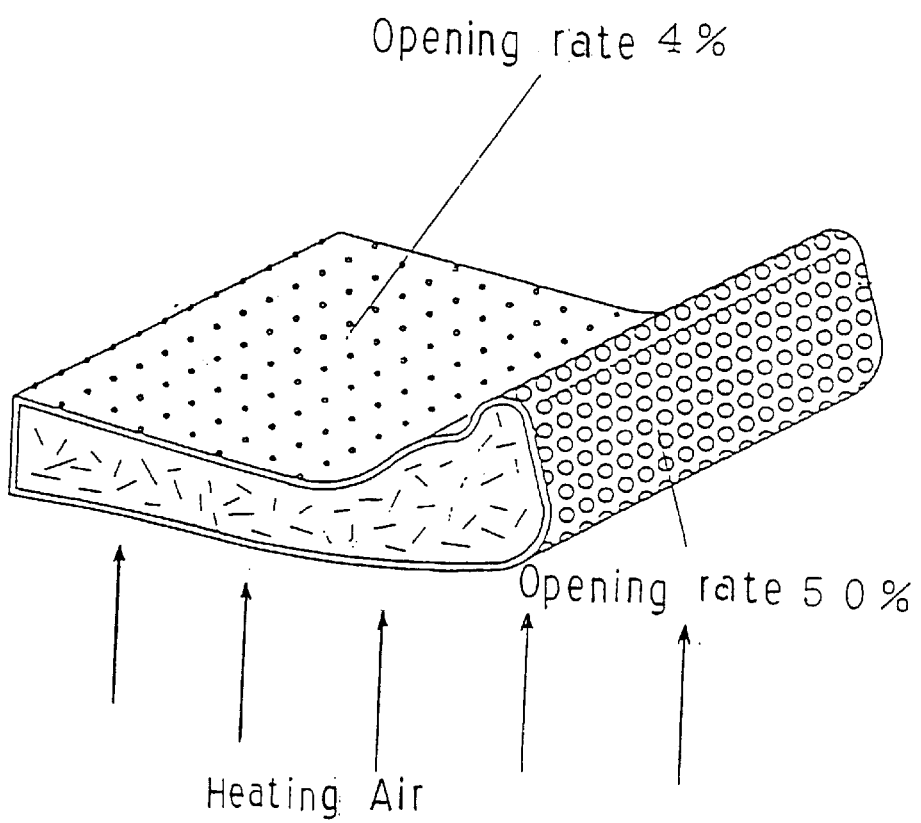

So to solve the above problem, the gas-permeability of the molds in the present invention are controlled by adjusting the distribution density and/or hole sizes of the holes punched in the molds (see in FIG. 6(b)), on the other hand the conventional gas-permeable molds having the uniform gas-permeability are used even if which part of the molds is taken out (see in FIG. 6 (b)).

That is to say, the parts of the molds corresponding to the portion of the fiber-aggregate F having the higher compression ratio are adjusted to have high distribution density and/or large hole size in order to easily pass through the molds, on the contrary, those corresponding to the portion of the fiber-aggregate having the lower compression ratio are adjusted to have low distribution density and/or small hole size. Thus, it makes the heating or the cooling air equally easy to pass through the fiber aggregate, so that the air is sufficiently supplied to the portion where the air could not easily penetrate but the air supply is limited to the portion where the excess air could easily penetrate. As a mold having such gas-permeability, sheet metal being punched a lot of holes, which is the works being bent in accordance with the destined surface shape of the cushion structure, is preferably used. And, a member having the gas-permeability, such as punching metal plate, metal wire netting, porous metal sinter, etc. can be suitably used, furthermore it is preferred that plural members among those may be combined and used it.

And, the heating air is supplied from the heating air generator 11 so that it flows through the bottom mold 6, the fiber aggregate F filled up in the mold cavity, and the upper mold 7 respectively. Here, said heating air generator 11 has the function both for heating up the air to the destined temperature and for supplying it to the destined place. At this case, the air exhaust device 9 is operated at the same time, and by doing like this the quantity of the heating air which flows through the fiber aggregate from its top side to the bottom one can be increased. Therefore, by using the heating air generator 11 and/or the air exhaust device 9, it allows that the heating air flows into the fiber aggregate F via the gas-permeable molds (6 and 7), and thereby the binder fibers contained in the fiber aggregate F are melted, and thereafter the fibers contained in the fiber aggregate are bonded with each other at their crossing points by the molten binder fibers which act as bonding agent.

Wherein, the heating air flowing through the fiber aggregate is required to have great calorie in order to heat up the bottom mold 6, the upper mold 7, the mold frame 5, the fiber aggregate F, and so on in its early heating stage. Therefore, during the thermal process which turns the fiber aggregate F into the cushion structure 20, it is preferred that quantities of heating air and/or the heating air heated in high temperature is flowed through the fiber aggregate in the early stage of the heating process. This becomes possible to operate the heating air generator 11 and the air exhaust device 9 at the same time. And, in the early stage, the temperature of the heating air makes higher than the melting temperature of the matrix fibers, but it is a premise that the temperature of matrix fibers could not reach to their melting temperature. Therefore, in this case, before the temperature of the matrix fibers reach to the melting one, the heating air temperature must be preliminarily changed to the temperature, which is higher than the melting temperature of the binder fibers, and also which is lower than that of the matrix fibers.

In the early stage of this heating process, the matrix fibers contained in the fiber aggregate is in the condition of room temperature before the heating process, so it requires the time for rising the temperature until a fiber aggregate reaches to its melting temperature. Then, the situation that the matrix fibers may melt does not arise provided that the heating air, having the higher temperature than the melting one of the matrix fibers, is sent into the fiber aggregate. Therefore, in the early stage of the heating process, it allows to send the heating air, having the higher temperature than the melting one of the matrix fibers, into the fiber-aggregate. But, when the heating air having such high temperature is went on supplying until it becomes close to the completion stage of the heating process, the matrix fibers themselves can be melted. Therefore, When the temperature of the matrix fibers approach to the melting one, the time for turning into the cushion structure is usually shortened, so that the heating air passing through the fiber aggregate is lowered to the temperature, which is higher than the melting temperature of the binder fibers and also which is lower than that of the matrix fibers, and/or so that the heating air quantity to be supplied into the fiber aggregate is also decreased over in the multiple stages. In addition, the timing switching the wind quantity and/or temperature of a heating air can be predicted to some extend by preliminarily estimating the heat capacity of the mold, the fiber aggregate, and so on when it is designed. However, it is important proper heat-treated condition is decided by execution of an experiment under the condition that it is actually and finally filled up the mold cavity with the fiber aggregate. Moreover, relating to this heating process, it is preferred that a heater is installed in the mold frame 5 in order to heat up said mold frame 5 in the desired temperature.

Figure 7:
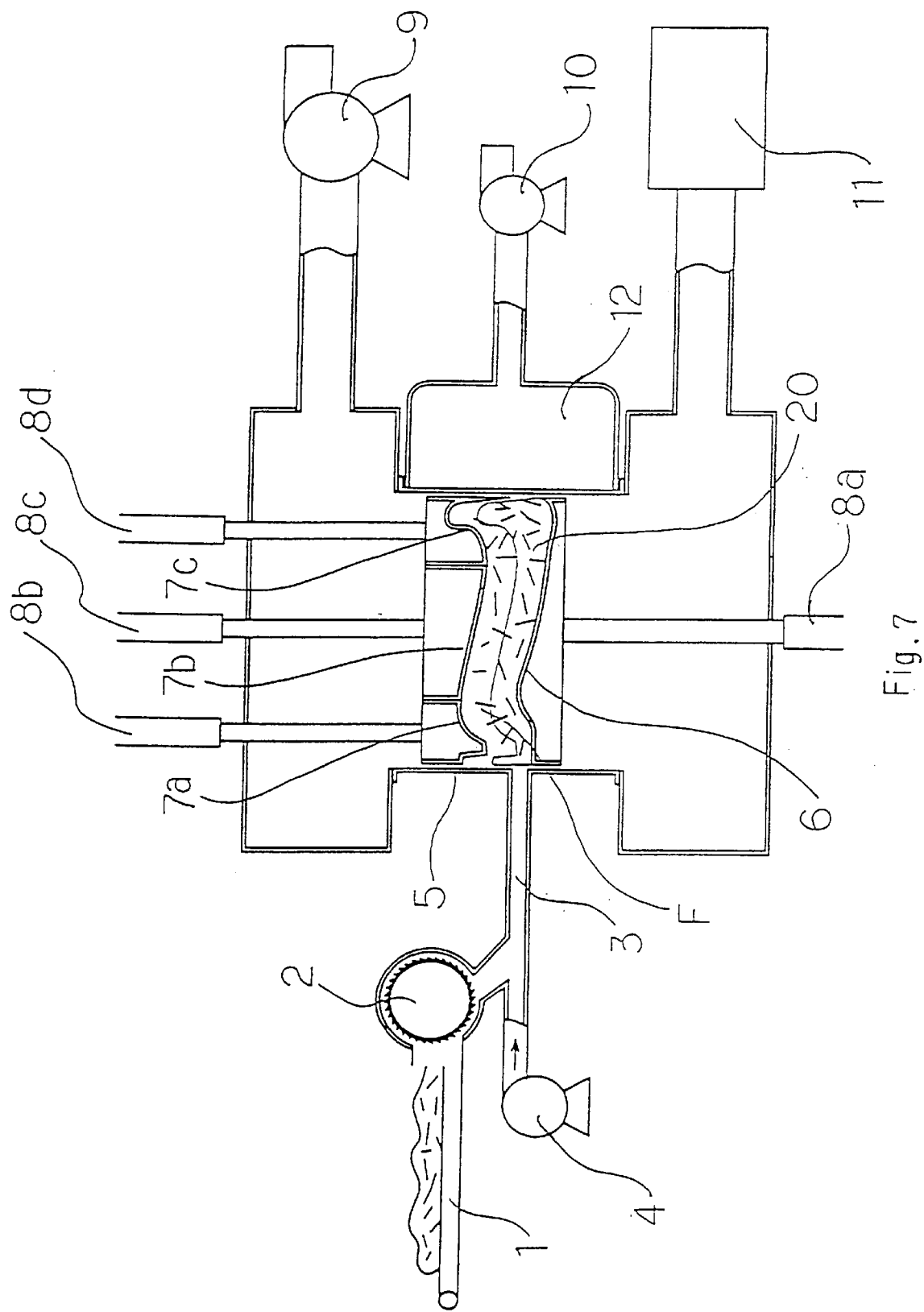
FIG. 7 is a schematic front view which shows the state of partially compressed fiber aggregate in the mold cavity in accordance with each required compression ratio in respective portion of the fiber aggregate.
Figure 8:
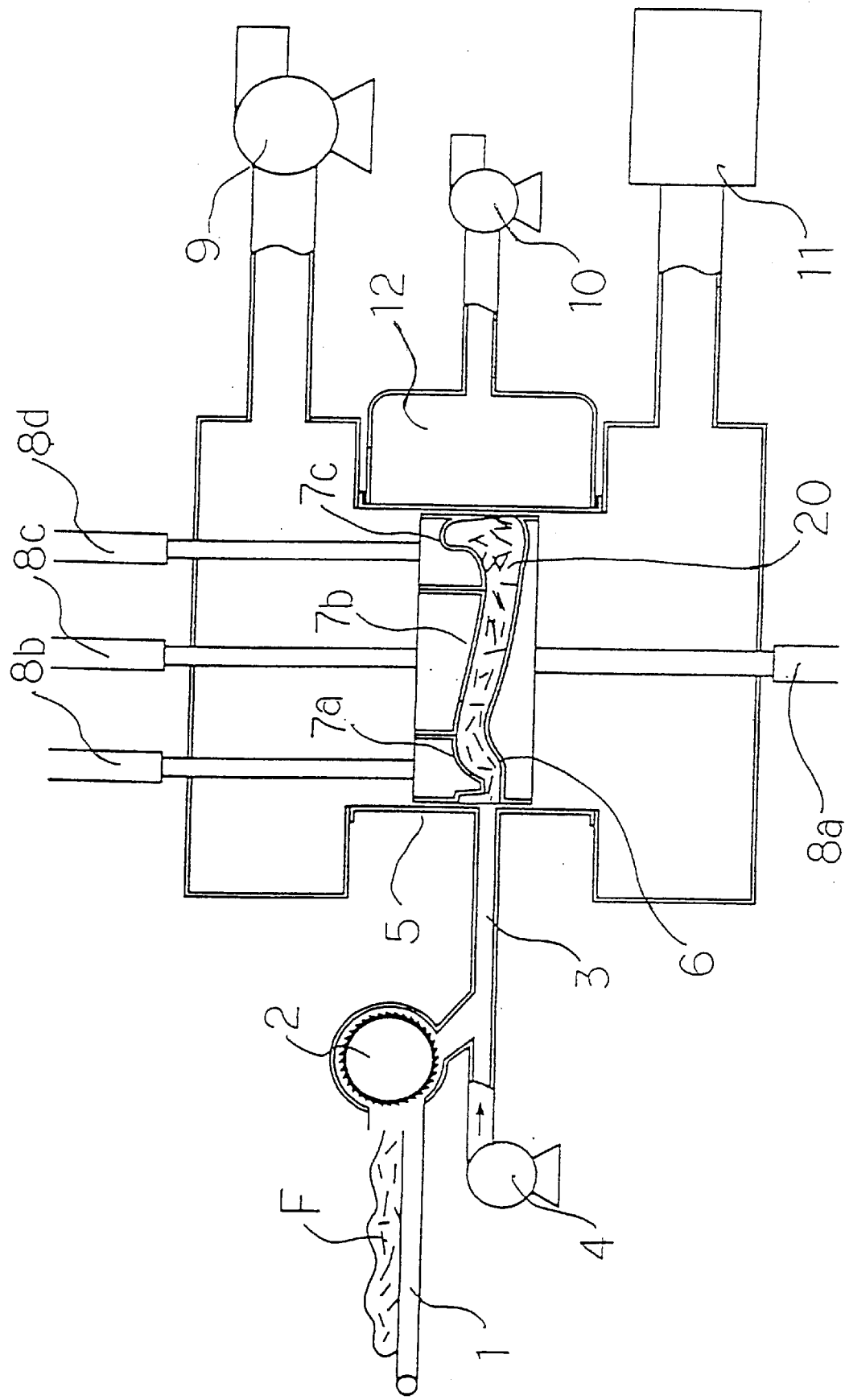
FIG. 8 is a schematic front view which shows the state of the fiber aggregate compressed to a position where it is finally turned into a cushion structure in the thermal process.

During the thermal process said above, it is desirable to absorb the heat contraction of the fiber aggregate F in the heating and/or the cooling process by compressing the fiber aggregate to the position where the cushion structure is finally molded (compression condition in FIG. 8), as a result of at least more than one time movement of the bottom mold 6 and/or the upper mold 7 during the heating and/or cooling process of the fiber aggregate filled up in the mold cavity C, or after the heating process. Therefore, the compression of the fiber aggregate before the heating process must require to preliminarily set up room for compression in order to compress it further during the heating and/or the cooling process (see the compressed condition in FIG. 7). This, during heating process, is carried out in order to avoid the case that it can't get the desired form of the cushion structure because of the thermal contracts of the heating fiber aggregate. And, this, during the cooling process, is also carried out in order to avoid the case that the compressed fiber structure springs back and expands by retrieving the elasticity which is weakened by heating, wherein the binding force of the binder fibers, binding the fibers with each other, is also weakened because the solidification of the binder is insufficient in this state.

When the heating process of the fiber aggregate F filled up in the mold cavity C therein is completed, the cooling process begins at once. This cooling process is carried out in order to retrieve the solidified state from the molten state of the binder fibers which combine the fibers in the fiber aggregate with each other.

During this cooling process for solidifying the binder fibers, it is important to pass the cooling air, which is induced from the top of the upper mold 7 by the air exhaust device 9, through the heated fiber aggregate therein from the bottom side to the upper side of the mold cavity. Because the fiber aggregate F turned into the cushion structure 20 is supported from the bottom side by the wind pressure of the cooling air, and therefore it makes it possible to attach the fiber aggregate to the upper mold 7. Herein, a temperature of the cooling air is preferred to be at most 40° C., this temperature may well be as possible as lower temperature in view of improving the cooling efficiency of the fiber aggregate F. But it is difficult to get the cooling air at a low price, so that, usually, air in the condition of the room temperature is often used as a cooling air.

While sustaining the state that the fiber aggregate is attached to the upper mold 7, the flow of the cooling air is stopped after the bottom mold 6 is moved downward by the actuator 8a (namely, stop the operation of 9 or shut down the pipe way connecting to the air exhaust device). By a series of procedures said above, the cushion structure 20, which is completed to cool down, falls downward due to the action of the gravity, because the wind pressure by the cooling air which is the source of the power to attach it to the upper mold 7 has already disappeared.

Figure 9:
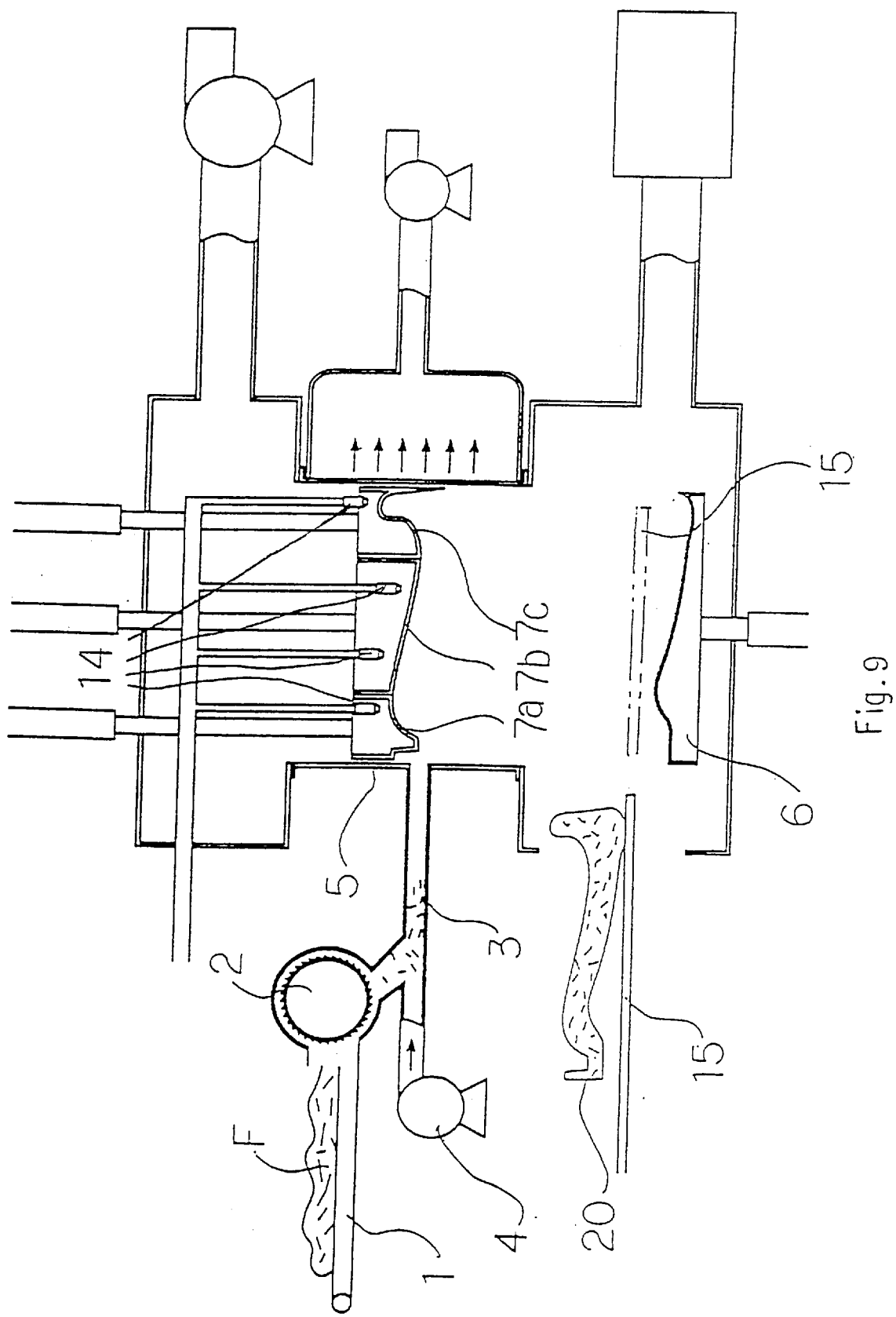
FIG. 9 is a schematic front view which shows the aspect to take out the cushion made from the fiber aggregate after the thermal process, by spraying compression air from the top of upper mold over the cushion structure stuck to the upper mold, then by falling it down, and finally by receiving it on a tray.

In addition, related to this cooling process, the cushion structure 20 can easily adhere to the upper mold 7, so that it occasionally causes that the cushion structure 20 can not fall down only by the stop of cooling air supply in the case that gravity is superior to the adhesive power. Therefore, after the flow of the cooling air is stopped, as shown in the FIG. 9, the compression air supplied by the air spray nozzle 14 is sprayed over the cushion structure 20 from the top of the upper mold 7. By going on like said above, the cushion structure 20 can be released from the upper mold 7 easily by the action of the compression air. Moreover, it is preferred that some of the members of the mold member group (7a~7c) thereof which the upper mold 7 is divided into are moved upward and/or downward, so that the cushion structure 20 is released from the upper mold 7. Thus, as shown in FIG. 9, the cushion structure 20 is received onto the tray 15, which is movable to the position where it may come to fall down, and by said tray 15, it is taken out from the apparatus for making a cushion structure.

We claim:

1. A process for preparing a cushion structure using fiber aggregate, comprising (a) preparing a fiber aggregate by mixing and dispersing synthetic binder fibers into synthetic matrix fibers, wherein the binder fibers are conjugated fibers composed of a binder component and a non-binder component, wherein the binder component has a melting point lower than that of the non-binder component and the matrix fibers;

(b) loosening an amount of the fiber aggregate with a loosening device;

(c) forming a mold cavity having a larger shape than that of a molded cushion structure, wherein the mold cavity is defined by a gas-permeable top mold movable upward and downward, a gas-permeable bottom mold movable upward and downward, and a fixed mold frame;

(d) filling the mold cavity with the fiber aggregate by directly transporting the loosened fiber from the loosening device to the mold cavity with a flow of air;

(e) compressing the fiber aggregate filled in the mold cavity by the gas-permeable top and/or bottom mold until the compressed fiber aggregate attains a desired bulk density;

(f) passing heated air through the compressed fiber aggregate via the gas-permeable top and bottom mold to fuse the binder component of the binder fibers so that the matrix fibers are bound with the molten binder fibers at their crossing points to form a heated fiber aggregate;

(g) cooling the heated fiber aggregate by passing a cooling air so as to unite the matrix fibers with solidified binder fibers;

(h) removing a molded cushion structure from the mold cavity by a downward movement of the bottom mold.

2. A process for preparing cushion structure using fiber aggregate as set forth in claim 1, wherein the matrix fibers are non-elastic, crimped polyester staple fibers.

3. A process for preparing cushion structure using fiber aggregate as set forth in claim 1, in which said binder component is a thermoplastic elastomer and said non-binder component is a non-elastomeric polyester, where the thermoplastic elastomer has a melting point of lower than that of the non-elastomeric polyester by at least 40° C., and wherein the thermoplastic elastomer is exposed at least at a half of the fiber surface.

4. A process for preparing cushion structure using fiber aggregate as set forth in claim 1, wherein said filling step (d) is carried out by transporting the loosened fiber aggregate through a transfer duct with an air flow blown into the transfer duct by a blower and/or a rotating cylinder of the loosening device, and further said transporting is carried out without interposing any device in the transfer duct through the loosening device to the mold cavity.

5. A process for preparing cushion structure using fiber aggregate as set forth in claim 1, wherein said top mold is divided into plural mold members which are individually sequentially movable upward and downward corresponding to each filled-up portion of the mold cavity so as to respectively compress said each filled-up portion to a respectively desired bulk density.

6. A process for preparing cushion structure using fiber aggregate as set forth in claim 5, wherein said each bulk density of the compressed fiber aggregate is respectively controlled by each movement of the divided mold members during and/or after said filling step (d).

7. A process for preparing cushion structure using fiber aggregate as set forth in claim 1, further comprising:
sucking air inside the mold cavity from the top and/or the bottom mold after said step (d), so that layers formed by accumulated fiber aggregate are arranged so as to make them juxtaposed relative to the mold surface.

8. A process for preparing cushion structure using fiber aggregate as set forth in claim 1, further comprising:
repeatedly compressing the fiber aggregate by the top and/or the bottom mold after said step (d), so that an array of layers formed by accumulated fiber aggregate in the mold cavity are randomized by said repetitive compressing of the filled-up fiber aggregate.

9. A process for preparing cushion structure using fiber aggregate as set forth in claim 1, wherein said step (d) is carried out by adjusting a mouth width of a transfer duct opened to the mold frame in accordance with a changing shape of accumulated fiber aggregate in the mold cavity, where the fiber aggregate is filled from a back part of the mold cavity.

10. A process for preparing cushion structure using fiber aggregate as set forth in claim 1, wherein said filling step (d) is carried out by accompanying the fiber aggregate by an air flow which is blown into the mold cavity with a right angle relative to a movable direction of the top and bottom mold.

11. A process for preparing cushion structure using fiber aggregate as set forth in claim 1, further comprising:
exhausting the air blown into the mold cavity with the fiber aggregate from the mold cavity during said filling step (d) by an exhaust device outside of the mold cavity.

12. A process for preparing cushion structure using fiber aggregate as set forth in claim 1, wherein a gas-permeability of each wall of said top and bottom mold is respectively adjusted corresponding to each flow resistance of filled-up portions of the mold cavity where the fiber aggregate is packed, so that the heating and cooling air can evenly pass through the fiber aggregate therein.

13. A process for preparing cushion structure using fiber aggregate as set forth in claim 1, wherein mold walls of the top and bottom mold are perforated so as to adjust hole distribution densities and/or sizes of holes to control the gas-permeability of the mold walls.

14. A process for preparing cushion structure using fiber aggregate as set forth in claim 1, further comprising:
during said step (f) and/or (g), moving the top and/or the bottom mold to a position where the fiber aggregate is finally molded as a cushion structure, so that a heat contraction of the molded cushion structure is absorbed by the movement.

15. A process for preparing cushion structure using fiber aggregate as set forth in claim 1, wherein said step (f) is carried out by changing an amount and/or a temperature of the heated air passing through the fiber aggregate in multiple stages.

16. A process for preparing cushion structure using fiber aggregate as set forth in claim 1, wherein said step (g) is carried out by passing the cooling air upward through the mold cavity from the bottom mold, so that said fiber aggregate stick to the top mold by the pressure of the cooling air.

17. A process for preparing cushion structure using fiber aggregate as set forth in claim 1, wherein, after downward moving of the bottom mold, said step (h) is carried out by spraying a compressed air from over the molded cushion structure via the top mold so as to cause it to fall down, and thereafter taking out the fallen cushion structure.

18. A process for preparing cushion structure using fiber aggregate as set forth in claim 1, wherein said step (g) is carried out by cooling air having a temperature of at most 40° C.

19. An apparatus for preparing a cushion structure from synthetic staple fiber aggregate having matrix fibers where binder fibers are dispersed and mixed, comprising the following elements (i)–(p):

(i) a loosening device for loosening the fiber aggregate;

(j) a fixed mold frame containing a side mold wall thereby, and further having open top and bottom ends;

(k) a gas-permeable top mold containing a top wall, movable upward and downward for closing the open top end of the mold frame;

(l) a gas-permeable bottom mold containing a bottom wall, movable upward and downward for closing the open bottom end of the mold frame, and the gas-permeable bottom mold enables removal of the molded cushion structure from a mold cavity by a downward movement;

(m) a transfer duct for transporting the fiber aggregate from the loosening device to a mold cavity which is defined by the side wall, the top wall, and the bottom wall;

(n) a blower for supplying a pressurized air to the transfer duct so as to accompany the fiber aggregate with the pressurized air for filling into the mold cavity;

(o) a heating air generator for generating a heated air which flows through the mold cavity filled-up with the fiber aggregate via gas-permeable top and bottom molds so as to melt the binder fibers; and (p) a cooling air supply device for supplying a cooling air which flows through the mold cavity filled-up with the fiber aggregate via gas-permeable top and bottom mold so as to solidify the molten binder fibers.

20. An apparatus for preparing a cushion structure as set forth in claim 19, wherein the each wall of the gas-permeable top and bottom mold respectively has holes with desired distribution densities and sizes in accordance with each bulk density of a filled-up portion of the fiber aggregate which is compressed by the top and/or the bottom mold.

21. An apparatus for preparing a cushion structure as set forth in claim 19, further comprising;

an adjustment device for adjusting a mouth width of the transfer duct in accordance with the changing front-edge-width of a back part of the mold cavity, wherein the mouth of the transfer duct is opened to the mold frame.

22. An apparatus for preparing a cushion structure as set forth in claim 19 wherein the cooling air supply device has a function for passing the cooling air through the mold cavity from the bottom mold to the top mold.

23. An apparatus for preparing a cushion structure as set forth in claim 19 further comprising;

an auxiliary exhaust device, which is installed in a gas-permeable side wall of the mold frame, for exhausting said air blown into the cavity with the fiber aggregate.

24. An apparatus for preparing a cushion structure as set forth in claim 23, wherein said auxiliary exhaust device is installed in an outside of said gas-permeable side wall of the mold frame for exhausting the blown air from the mold cavity.

25. An apparatus for preparing a cushion structure as set forth in claim 19 further comprising;

actuators for respectively independently moving each divided mold member of the top mold and the bottom mold upward and downward relative to the mold frame, wherein said each actuator respectively has a positioning device for controlling each position for compressing the fiber aggregate over multiple stages.

26. An apparatus for preparing a cushion structure as set forth in claim 19 further comprising;

an air suction device for sucking air inside the mold cavity from the top and bottom mold through the fiber aggregate.

27. An apparatus for preparing a cushion structure as set forth in claim 19, further comprising;

air spray nozzles for spraying compression air over a molded cushion structure from a top of the top mold.

28. An apparatus for preparing a cushion structure as set forth in claim 19 further comprising;

a tray for receiving the falling molded cushion structure, wherein the tray is movable to an open space formed by a downward moving of the bottom mold.

* * * * *